United States Patent
Seo et al.

(10) Patent No.: US 9,986,561 B2
(45) Date of Patent: May 29, 2018

(54) RESOURCE ALLOCATION METHOD FOR CONTROL SIGNAL OF DEVICE-TO-DEVICE COMMUNICATION IN WIRELESS COMMUNICATION SYSTEM AND DEVICE THEREFOR

(71) Applicant: LG ELECTRONICS INC., Seoul (KR)

(72) Inventors: Hanbyul Seo, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/118,672

(22) PCT Filed: Feb. 11, 2015

(86) PCT No.: PCT/KR2015/001376
§ 371 (c)(1),
(2) Date: Aug. 12, 2016

(87) PCT Pub. No.: WO2015/122684
PCT Pub. Date: Aug. 20, 2015

(65) Prior Publication Data
US 2017/0064704 A1    Mar. 2, 2017

Related U.S. Application Data

(60) Provisional application No. 61/940,487, filed on Feb. 16, 2014, provisional application No. 61/951,511, (Continued)

(51) Int. Cl.
*H04W 4/00* (2018.01)
*H04W 72/04* (2009.01)
(Continued)

(52) U.S. Cl.
CPC ... *H04W 72/0446* (2013.01); *H04W 56/0005* (2013.01); *H04W 72/02* (2013.01); *H04W 8/005* (2013.01); *H04W 92/18* (2013.01)

(58) Field of Classification Search
CPC .......... H04W 72/0446; H04W 72/02; H04W 56/0005; H04W 92/18; H04W 72/04;
(Continued)

(56) References Cited

U.S. PATENT DOCUMENTS

2013/0102314 A1*  4/2013  Koskela ............ H04W 36/0072
                                                           455/436
2013/0163555 A1*  6/2013  Turtinen ............ H04W 76/023
                                                           370/330
(Continued)

FOREIGN PATENT DOCUMENTS

WO    2013077684 A1    5/2013

OTHER PUBLICATIONS

Sony: "D2D Communication Resource Scheduling", 3GPP TSG-RAN WG1 Meeting #76, R1-140589, Feb. 10-14, 2014.
(Continued)

*Primary Examiner* — Kevin Mew
(74) *Attorney, Agent, or Firm* — Dentons US LLP

(57) ABSTRACT

Disclosed is a method by which a terminal sets a resource pool for device-to-device communication in a wireless communication system. Particularly, the method comprises the steps of: acquiring information on a scheduling assignment (SA) resource pool through a synchronization step with a specific terminal; detecting a resource allocation SA in the SA resource pool; receiving a first D2D data channel including a resource pool allocation message on the basis of the resource allocation SA; and setting a resource pool for a second D2D data channel including user data and/or a
(Continued)

resource pool for a discovery signal, according to the resource pool allocation message.

16 Claims, 11 Drawing Sheets

Related U.S. Application Data filed on Mar. 11, 2014, provisional application No. 61/977,634, filed on Apr. 10, 2014, provisional application No. 61/986,060, filed on Apr. 29, 2014, provisional application No. 62/097,599, filed on Dec. 30, 2014.

(51) Int. Cl.
*H04W 72/02* (2009.01)
*H04W 56/00* (2009.01)
*H04W 92/18* (2009.01)
*H04W 8/00* (2009.01)

(58) Field of Classification Search
CPC .......... H04W 72/0406; H04W 72/044; H04W 72/0453
See application file for complete search history.

(56) References Cited

U.S. PATENT DOCUMENTS

| | | | | |
|---|---|---|---|---|
| 2013/0258996 | A1* | 10/2013 | Jung | H04W 72/1284 370/330 |
| 2013/0322413 | A1* | 12/2013 | Pelletier | H04W 72/1289 370/336 |
| 2014/0328329 | A1* | 11/2014 | Novlan | H04W 72/042 370/336 |
| 2016/0044619 | A1* | 2/2016 | Ryu | H04W 56/0015 370/350 |
| 2016/0044653 | A1* | 2/2016 | Bagheri | H04W 72/0413 370/329 |
| 2016/0066317 | A1* | 3/2016 | Chae | H04J 1/02 370/336 |
| 2016/0135240 | A1* | 5/2016 | Yoon | H04W 76/023 370/329 |
| 2016/0205713 | A1* | 7/2016 | Seo | H04W 76/023 370/280 |
| 2016/0278003 | A1* | 9/2016 | Kim | H04W 48/16 |
| 2017/0041971 | A1* | 2/2017 | Kim | H04W 72/12 |
| 2017/0079084 | A1* | 3/2017 | Matsumoto | H04W 72/04 |
| 2017/0142764 | A1* | 5/2017 | Yasukawa | H04W 76/023 |
| 2017/0164388 | A1* | 6/2017 | Sorrentino | H04W 72/1263 |
| 2017/0230915 | A1* | 8/2017 | Kim | H04W 52/34 |
| 2017/0238260 | A1* | 8/2017 | Kim | H04W 52/04 |

OTHER PUBLICATIONS

Ericsson: "Synchronization Procedures for D2D Discovery and Communication", 3GPP TSG RAN WG1 Meeting #76, R1-140773, Feb. 10-14, 2014.
Ericsson: "Frame Structure for D2D-Enabled LTE Carriers", 3GPP TSG RAN WG1 Meeting #76, R1-140775, Feb. 10-14, 2014.
Ericsson: "On scheduling procedure for D2D", 3GPP TSG-RAN WG1 Meeting #76, R1-140778, Feb. 10-14, 2014.
Intel Corporation: "Resource allocation for D2D communication", R2-140312, 3GPP TSG RAN WG2 Meeting #85, Prague, Czech Republic, Feb. 10-14, 2014, pp. 3-4.
Ericsson: "D2D Scheduling Procedure", R2-134238, 3GPP TSG RAN WG2 Meeting #84, San Francisco, USA, Nov. 11-15, 2013, pp. 2-5.

* cited by examiner

FIG. 2
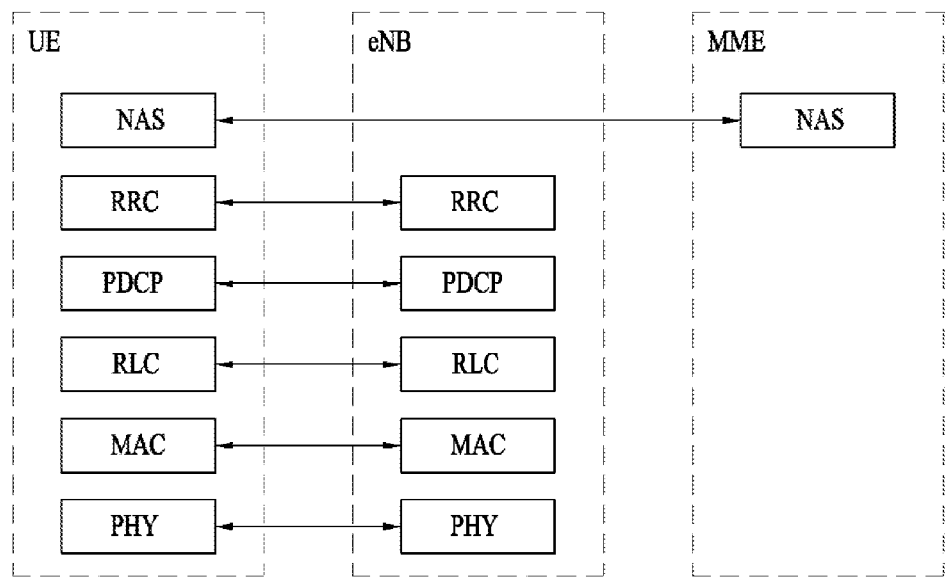
(A) CONTROL-PLANE PROTOCOL STACK
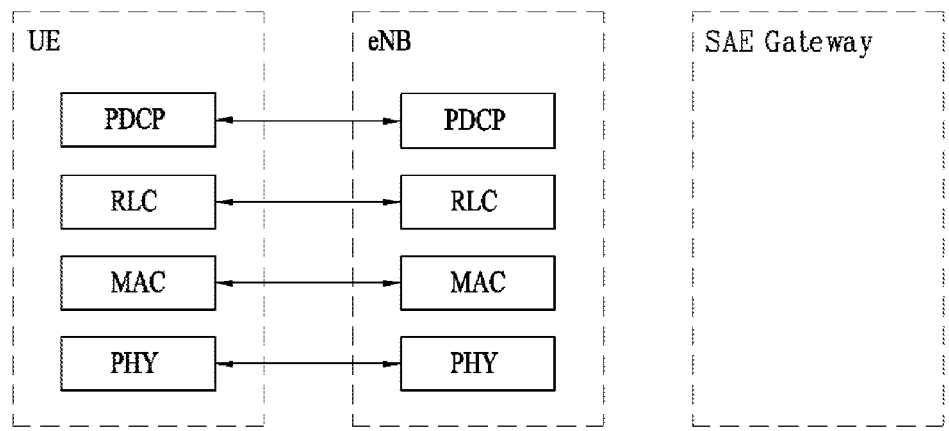
(B) USER-PLANE PROTOCOL STACK

RESOURCE ALLOCATION METHOD FOR CONTROL SIGNAL OF DEVICE-TO-DEVICE COMMUNICATION IN WIRELESS COMMUNICATION SYSTEM AND DEVICE THEREFOR This application is a National Stage Application of International Application No. PCT/KR2015/001376 filed Feb. 11, 2015, which claims priority from U.S. Provisional Application No. 61/940,487 filed on Feb. 16, 2014, U.S. Provisional Application No. 61/951,511 filed on Mar. 11, 2014, U.S. Provisional Application No. 61/977,634 filed on Apr. 10, 2014, U.S. Provisional Application No. 61/986,060 filed on Apr. 29, 2014, U.S. Provisional Application No. 62/097,599 filed on Dec. 30, 2014, each of which are hereby incorporated by reference in their entirety.

TECHNICAL FIELD

The present invention relates to a wireless communication system, and more particularly, to a method of allocating a resource for a control signal of direct device-to-device communication in a wireless communication system and an apparatus therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

Based on the aforementioned discussion, the present invention intends to propose a method of allocating a resource for a control signal of direct device-to-device communication in a wireless communication system and an apparatus therefor in the following description.

Technical Solution

To achieve these and other advantages and in accordance with the purpose of the present invention, as embodied and broadly described, according to one embodiment, a method of setting a resource pool, which is set by a user equipment for direct device-to-device communication in a wireless communication system, includes the steps of obtaining information on an SA (scheduling assignment) resource pool via a synchronization procedure with a specific user equipment, detecting a resource allocation SA from the SA resource pool, receiving a first D2D data channel including a resource pool allocation message based on the resource allocation SA, and setting at least one of a resource pool for a second D2D data channel including user data and a resource pool for a discovery signal according to the resource pool allocation message.

To further achieve these and other advantages and in accordance with the purpose of the present invention, according to a different embodiment, a user equipment performing direct device-to-device communication in a wireless communication system includes a wireless communication module configured to transceive a signal with a different user equipment or a network and a processor configured to process the signal, the processor configured to control the wireless communication module to obtain information on an SA (scheduling assignment) resource pool via a synchronization procedure with a specific user equipment and receive a first D2D data channel including a resource pool allocation message based on the resource allocation SA, the processor configured to set at least one of a resource pool for a second D2D data channel including user data and a resource pool for a discovery signal according to the resource pool allocation message.

In this case, the user equipment can receive a synchronization channel including a synchronization signal and additional information for the synchronization signal from the specific user equipment via the synchronization procedure. In this case, the information on the SA resource pool is included in the synchronization channel Preferably, the SA resource pool can be located at a subframe apart from a subframe in which the synchronization signal and the synchronization channel are received as much as a predetermined offset.

Or, the user equipment can receive a synchronization channel from the specific user equipment via the synchronization procedure. In this case, the SA resource pool can be located at a subframe apart from a subframe in which the synchronization signal is received as much as a predetermined offset.

In addition, the user equipment receives a normal SA including resource allocation information of the second data channel in the SA resource pool and can transmit the second D2D data channel using one or more resource units included in a resource pool for the second D2D data channel according to the resource allocation information. In this case, the SA resource pool can be classified into a resource unit for the resource allocation SA and a resource unit for the normal SA.

Or, the user equipment can transmit the second D2D data channel by randomly selecting at least one or more resource units included in the resource pool for the second D2D data channel Of course, the user equipment can transmit the discovery signal by randomly selecting at least one or more resource units included in the resource pool for the discovery signal.

Advantageous Effects

According to embodiments of the present invention, it is able to efficiently allocate a resource for a control signal of direct device-to-device communication and efficiently transmit and receive a signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a user equipment and E-UTRAN based on the 3GPP radio access network standard;

BEST MODE

Mode for Invention

Figure 1:
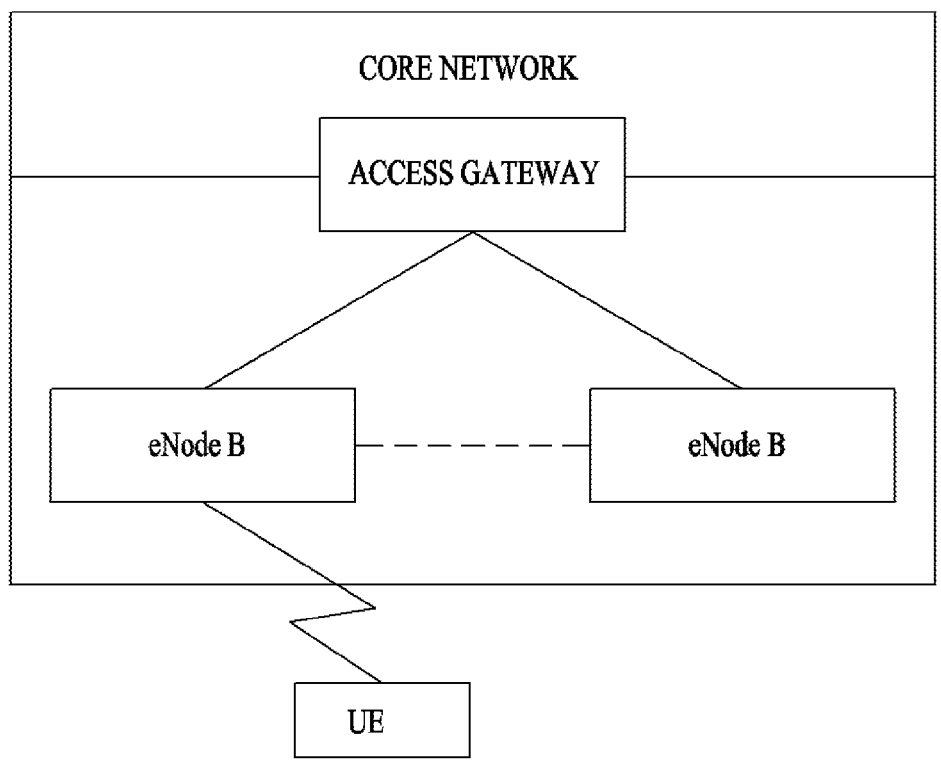
FIG. 1 is a schematic diagram of E-UMTS network structure as one example of a wireless communication system.

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

In the present specification, a name of a base station can be used as a comprehensive terminology including an RRH (remote radio head), an eNB, a TP (transmission point), an RP (reception point), a relay, and the like.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel The PHY layer is connected to a medium access control (MAC) layer located on the higher layer via a transport channel Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. If there is RRC connection between a user equipment and an RRC layer of a network, the user equipment is in an RRC connected mode. Otherwise, the user equipment is in an RRC idle mode. A NAS (non-access stratum) layer, which is located at the top of the RRC layer, performs such a function as session management and mobility management.

One cell constituting a base station (eNB) is set to one of bandwidths of 1.4, 3.5, 5, 10, 15, and 20MHz and provides a downlink or uplink transmission service to several user equipments. At this time, different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
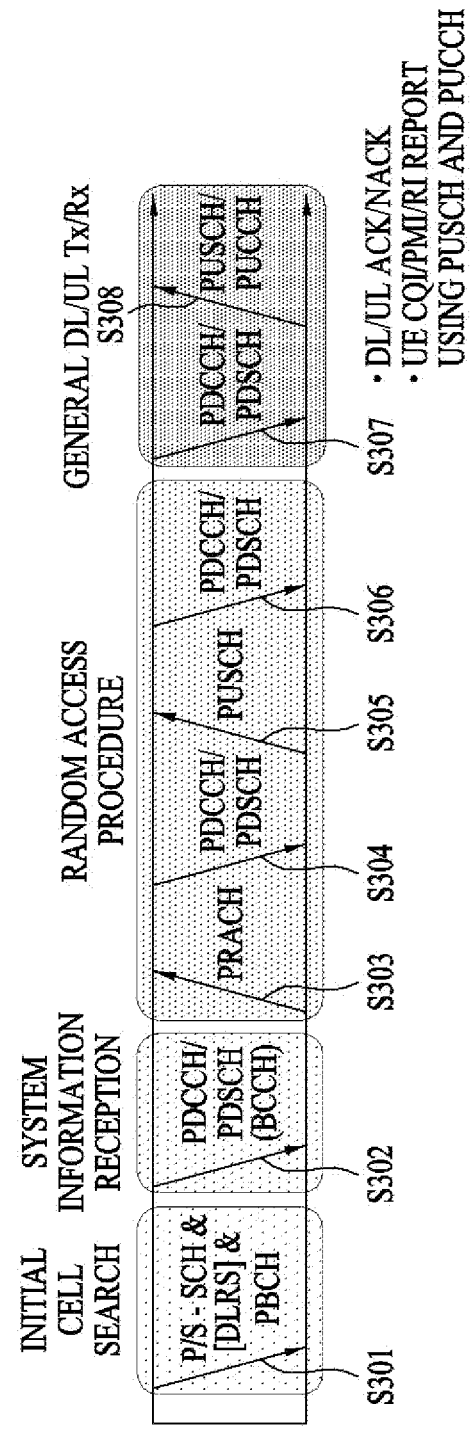
FIG. 3 is a diagram illustrating physical channels used in a 3GPP LTE system and a general method for transmitting a signal using the physical channels.

FIG. 3 is a diagram showing physical channels used in a 3GPP system and a general signal transmission method using the same.

When a UE is powered on or enters a new cell, the UE performs an initial cell search operation such as synchronization with an eNB (S301). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S302).

When the UE initially accesses the eNB or has no radio resources for signal transmission, the UE may perform a random access procedure (RACH) with respect to the eNB (steps S303 to S306). To this end, the UE may transmit a specific sequence as a preamble through a physical random access channel (PRACH) (S303 and S305) and receive a response message to the preamble through the PDCCH and the PDSCH corresponding thereto (S304 and S306). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S308), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
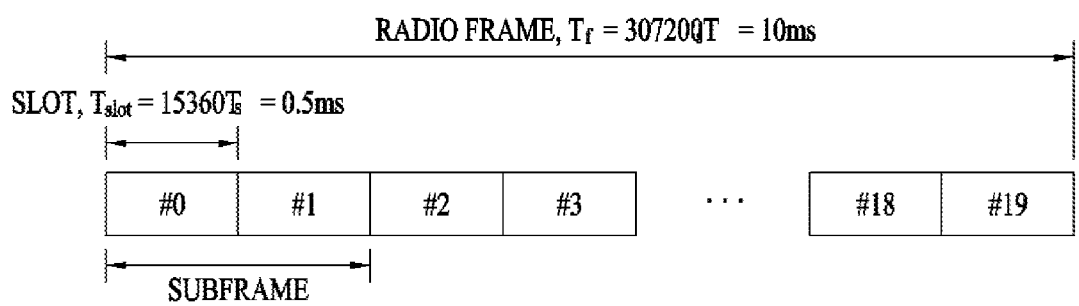
FIG. 4 is a diagram illustrating a structure of a radio frame used in an LTE system.

FIG. 4 is a diagram for a structure of a radio frame used in an LTE system.

Referring to FIG. 4, one radio frame has a length of 10 ms (327,200×TS) and is constructed with 10 subframes in equal size. Each of the subframes has a length of 1 ms and is constructed with two slots. Each of the slots has a length of 0.5 ms (15,360×TS). In this case, Ts indicates a sampling time and is represented as Ts=1/(15 kHz 2048)=3.2552× 10−8 (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
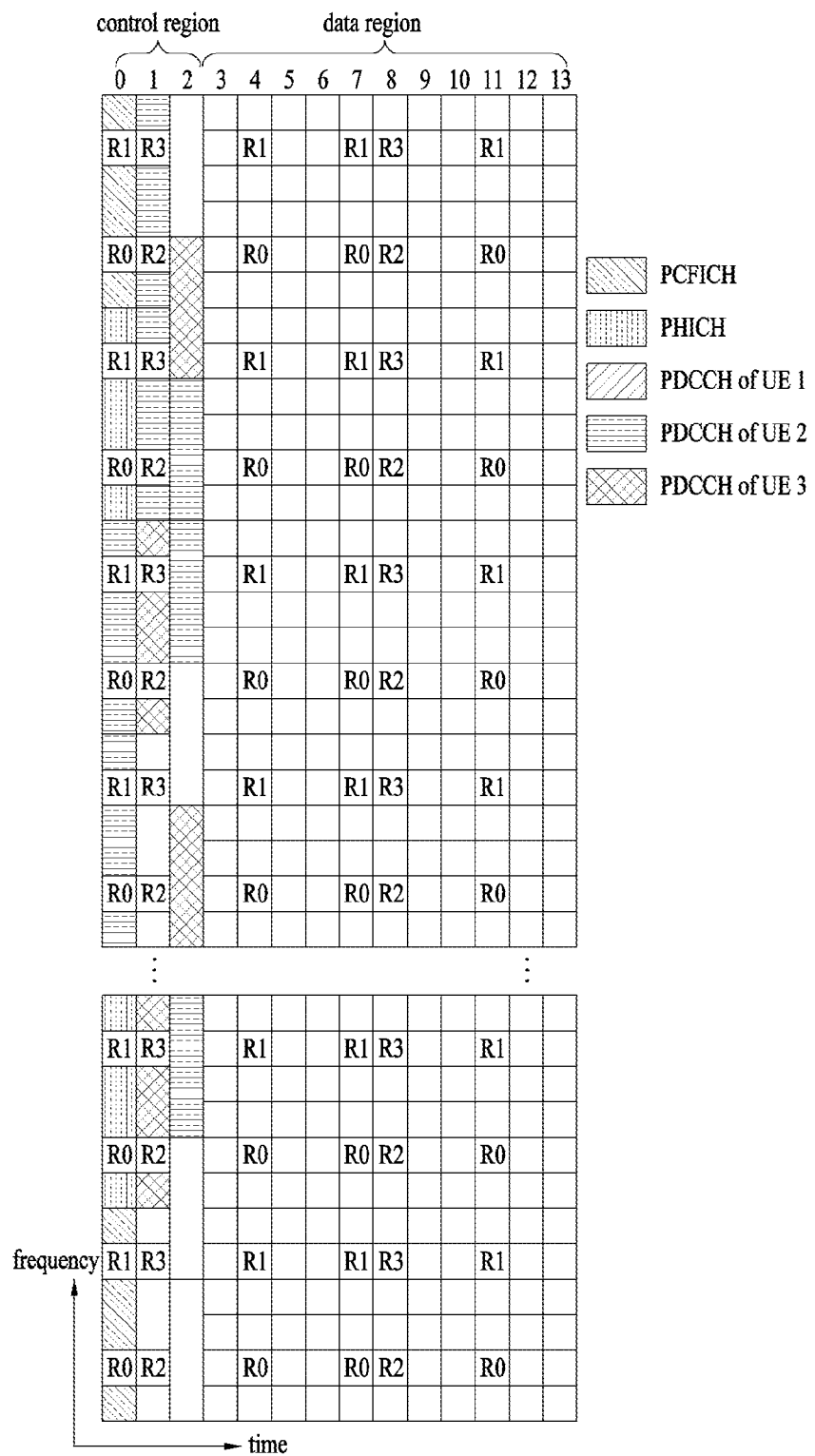
FIG. 5 is a diagram illustrating a structure of a downlink radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
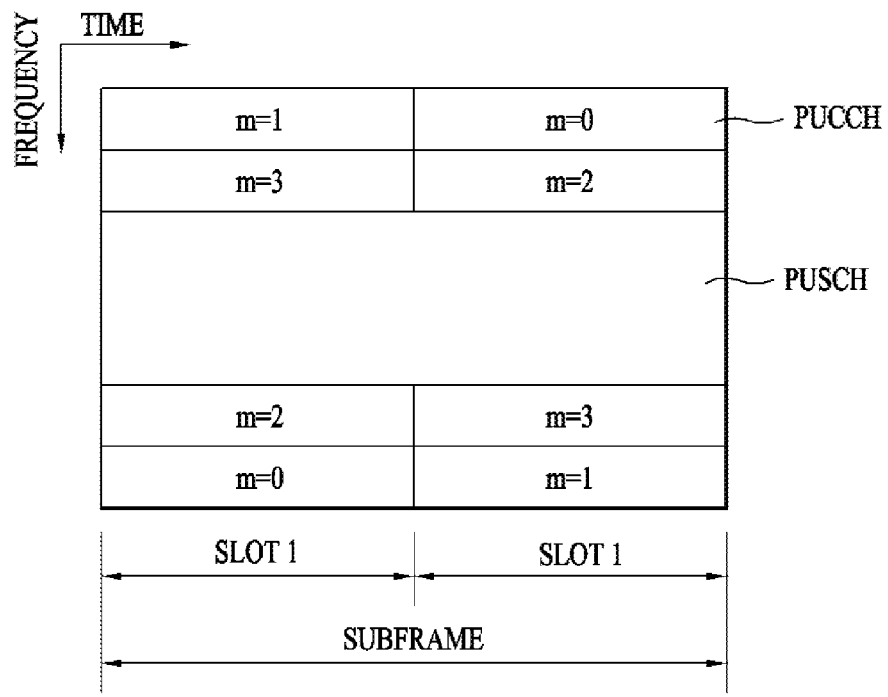
FIG. 6 is a diagram illustrating a structure of an uplink subframe used in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
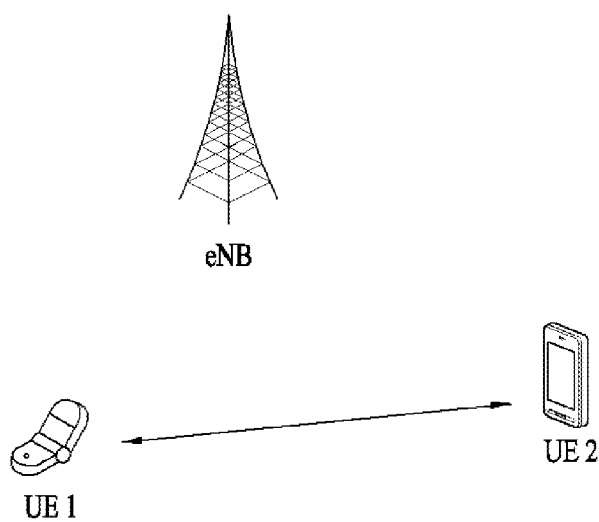
FIG. 7 is a conceptual diagram illustrating direct device-to-device communication.

FIG. 7 is a conceptual diagram illustrating direct device-to-device communication.

Referring to FIG. 7, in D2D (device-to-device) communication that a UE performs direct wireless communication with a different UE, i.e., direct device-to-device communication, an eNB can transmit a scheduling message for indicating D2D transmission and reception. A UE participating in the D2D communication receives a D2D scheduling message from the eNB and performs a transmission and reception operation indicated by the D2D scheduling message. In this case, although the UE corresponds to a terminal of a user, if such a network entity as an eNB transmits and receives a signal according to a communication scheme between UEs, the network entity can also be considered as a sort of UEs. In the following, a link directly linked between UEs is referred to as a D2D link and a link used for a UE to communicate with an eNB is referred to as an NU link.

In order to perform a D2D operation, a UE performs a discovery procedure to identify whether or not a counterpart UE is located at a near area capable of performing D2D communication. The discovery procedure is performed in a manner that a UE transmits a unique discovery signal capable of identifying the UE and a neighboring UE identifies the UE, which has transmitted the discovery signal, located at a near location by detecting the discovery signal. In particular, each UE checks whether or not a counterpart UE exists at a near location via the discovery procedure and performs D2D communication transmitting and receiving an actual user data.

Meanwhile, a case that a UE 1 selects a resource unit corresponding to a specific resource from a resource pool corresponding to a set of a series of resources and a D2D signal is transmitted using the selected resource unit is explained in the following. In this case, In this case, if the UE 1 is located within coverage of a base station, the base station can inform the UE 1 of the resource pool. If the UE 1 is located at the outside of the coverage of the base station, a different UE may inform the UE 1 of the resource pool or the resource pool can be determined by resources determined in advance. In general, a resource pool consists of a plurality of resource units. Each UE selects one or a plurality of resource units and may be then able to use the selected resource unit(s) to transmit a D2D signal of the UE.

Figure 8:
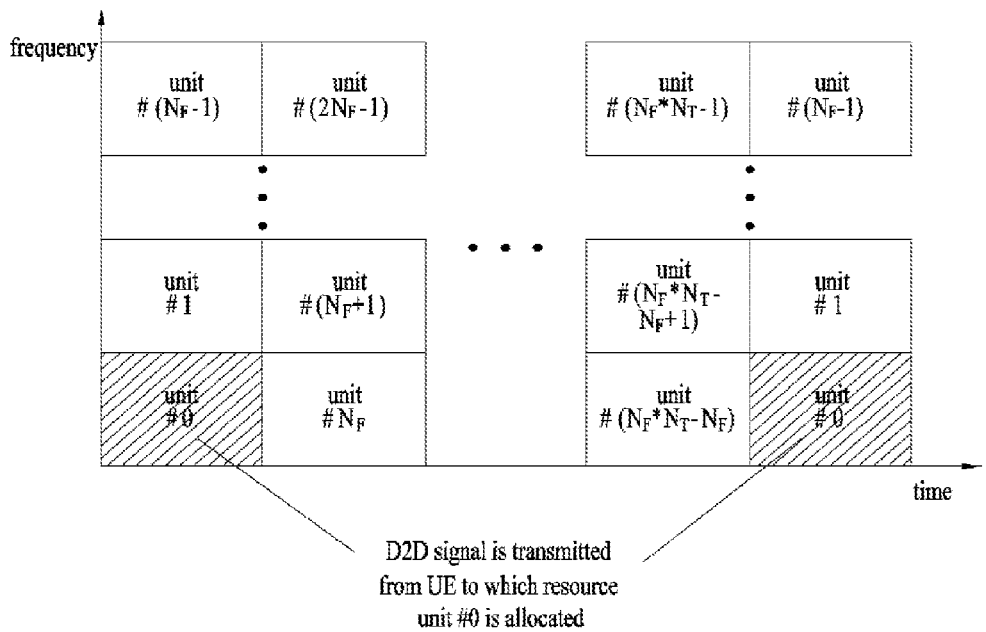
FIG. 8 is a diagram illustrating an example of configuring a resource pool and a resource unit.

FIG. 8 is a diagram illustrating an example of configuring a resource pool and a resource unit.

Referring to FIG. 8, it shows a case that the NF*NT number of resource units in total are defined in a manner that the total frequency resources are divided into NF number of frequency resources and the total time resources are divided into NT number of time resources. In particular, it is able to see that a corresponding resource pool is repeated with a period of NT subframe. Specifically, a resource unit can periodically and repeatedly appear. Or, in order to obtain diversity gain in time or frequency domain, an index of a physical resource unit to which a logical resource unit is mapped may change with a predetermined pattern according to time. In this resource unit structure, a resource pool may correspond to a set of resource units capable of being used by a UE intending to transmit a D2D signal.

The aforementioned resource pool can be segmented into various types. First of all, the resource pool can be distinguished from each other according to content of a D2D signal transmitted from each resource pool. As an example, as shown in 1) to 3) in the following, the content of the D2D signal can be divided into an SA, a D2D data channel and a discovery signal. A separate resource pool can be configured according to each of the contents.

1) SA (scheduling assignment): corresponds to a signal including information on a resource position used by each transmission UE for a D2D data channel to be transmitted and information on MCS (modulation and coding scheme), MIMO transmission scheme and the like necessary for demodulating a D2D data channel. The SA can be transmitted on an identical resource unit in a manner of being multiplexed with D2D data. In this case, an SA resource pool may correspond to a resource pool in which the SA is transmitted in a manner of being multiplexed with D2D data.

2) D2D data channel corresponds to a channel used by a transmission UE to transmit user data. If it is possible to transmit SA and D2D data on an identical resource unit in a manner of multiplexing the SA and the D2D data together, a resource element (RE), which was used to transmit SA information on a specific resource unit within an SA resource pool, can also be used to transmit D2D data in a D2D data channel resource pool.

3) Discovery signal: corresponds to a resource pool for a signal that enables a neighboring UE to discover a transmission UE. The transmission UE transmits such information as an ID of the transmission UE and the like to the neighboring UE to make the neighboring UE discover the transmission UE.

Meanwhile, although the aforementioned contents of the D2D signal are identical to each other, it may be able to use a different resource pool according to a transmission and reception property of the D2D signal. For example, an identical D2D data channel or a discovery message can be identified as a different resource pool according to a scheme of determining transmission timing of a D2D signal, a scheme of allocating a resource, or a signal format.

In this case, for example, the scheme of determining transmission timing of a D2D signal can be determined based on whether a D2D signal is transmitted at the timing of receiving a synchronization reference signal or whether a D2D signal is transmitted at the timing of receiving the synchronization reference signal to which prescribed TA (timing advance) is applied. And, for example, the scheme of allocating a resource can be determined based on whether an eNB designates a transmission resource of an individual D2D signal to an individual transmission UE or whether an individual transmission UE randomly selects an individual signal transmission resource from a resource pool. Lastly, for example, the signal format can be determined based on the number of symbols occupied by a D2D signal in a subframe or the number of subframes used for transmitting a D2D signal.

<Embodiment 1>

According to the aforementioned description, it may be able to configure a plurality of resource pools in the aspect of a single D2D UE. In this case, a signaling scheme for configuring each of a plurality of the resource pools may vary according to an attribute of each resource pool. Hence, it is able to configure a resource pool with less time delay using a more flexible scheme. In particular, an SA resource pool can be signaled with a form distinguished from a different resource pool.

For example, an SA resource pool can be signaled in the course of D2D synchronization. A D2D communication operation can be performed at the outside of coverage of an eNB. In this case, if a UE transmits a synchronization signal, neighboring UEs match synchronization with the signal and a D2D signal can be transceived between the UE and the neighboring UEs.

In this case, since an SA corresponds to information delivered prior to all D2D operations, an SA resource pool can be configured to be signaled between UEs in the course of synchronization. A UE transmitting a synchronization signal (e.g., a D2DSS (D2D synchronization signal)) can transmit a channel (e.g., PD2DSCH (physical D2D synchronization channel)) on which additional information on the synchronization signal is loaded as well. In this case, information on an SA resource pool can be transmitted via a partial field of the channel on which the additional information is loaded.

Meanwhile, other resource pools except the SA resource pool can be signaled in a form of a higher layer payload using a D2D data channel In particular, a resource pool for a D2D data channel or a D2D discovery signal is transmitted via a different D2D data channel The aforementioned operation is explained with reference to an SA resource pool. First of all, an SA resource pool is set to a UE in a D2D synchronization procedure and an SA including signaling for setting the rest of resource pools is discovered in the SA resource pool. In this case, if a first D2D data channel is received via a resource designated by the discovered SA, it is able to obtain information on a resource pool for a second D2D data channel or a D2D discovery signal. In particular, the first D2D data channel includes the information on the resource pool for the second data channel or the D2D discovery signal and the second D2D data channel includes user data. In the following, the aforementioned resource pool configuration method is referred to as a 2-step resource pool configuration method.

Figure 9:
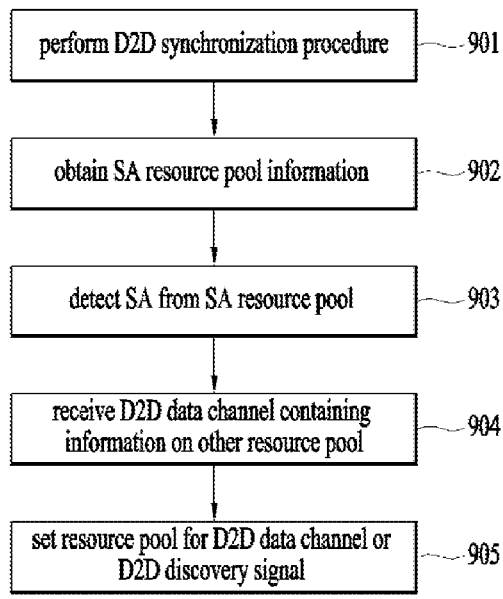
FIG. 9 is a flowchart for a method of setting a two-step resource pool according to a first embodiment of the present invention.

FIG. 9 is a flowchart for a method of setting a 2-step resource pool according to a first embodiment of the present invention. In particular, in FIG. 9, assume that a UE transmitting a signal on which a D2D synchronization signal and additional information on the D2D synchronization signal are loaded corresponds to a UE belonging to coverage of an eNB. In this case, the UE transmits a D2D synchronization signal in accordance with a synchronization signal received from the eNB and it may be able to transmit the signal for the additional information in accordance with content informed by the eNB. And, a UE receiving a D2D synchronization signal and obtaining the additional information may correspond to a UE located at the outside of the coverage of the eNB.

Referring to FIG. 9, in the step S901, a D2D UE performs a D2D synchronization procedure by receiving a D2DSS and PD2DSCH. In the step S902, the D2D UE obtains information on an SA resource pool via the D2D synchronization procedure (e.g., based on information included in the PD2DSCH). Subsequently, the D2D UE detects an SA from the SA resource pool in the step S903.

Subsequently, in the step S904, the D2D UE detects a first D2D data channel according to information included in the SA. In this case, it is preferable that the first D2D data channel includes information on a different resource pool. Lastly, in the step S905, the D2D UE sets a resource pool for a second D2D data channel including actual user data or a resource pool for a D2D discovery signal using information included in the first D2D data channel.

According to the 2-step resource pool configuration method of the present invention, an SA (hereinafter, a resource configuration SA) for designating a resource in which resource pool configuration signaling is transmitted can be distinguished from an SA (hereinafter, a normal SA) for designating a resource in which a normal user data is transmitted.

As an example, various transmission parameters used by a resource configuration SA are distinguished from various parameters of the normal SA in various parameters including a seed value for generating a DM-RS, a CS (cyclic shift) value applied to a DM-RS sequence, a scrambling sequence generation parameter for scrambling a bit sequence transmitted to an SA, a parameter for masking a CRS granted to SA information, and the like. Preferably, a series of parameters used by the resource configuration SA can be designated by a value incapable of being used by the normal SA. By doing so, it may be able to obtain an interference randomization effect between the resource configuration SA and the normal SA.

As a different example, a resource to which the resource configuration SA is transmitted (or capable of being transmitted) can be distinguished from a resource to which the normal SA is transmitted. In an SA resource pool, the resource to which the resource configuration SA is transmitted can be distinguished from each other in such a form as a resource including a specific index value or resources including an index of a specific range (e.g., K number of resources including indexes ranging from 0 to K−1). This method is very useful in a scheduling scheme that an individual UE autonomously determines an SA transmission resource of the individual UE rather than a scheduling scheme that an eNB designates the SA transmission resource of the individual UE. Specifically, if such a resource for an SA important to all UEs as the resource configuration SA is separated from a resource for a normal SA, it may be able to prevent a collision problem that the normal SA and the resource configuration SA are collided with each other in an identical resource.

In other word, a UE transmits the normal SA in a manner of selecting one from among resources except a resource designated as a resource capable of transmitting the resource configuration SA. A region of an SA resource capable of being used by the resource configuration SA can be delivered to the UE by designating K value via PD2DSCH in the synchronization procedure.

More specifically, an SA resource to which a resource configuration SA is transmitted (or capable of being transmitted) can be distinguished from a normal SA resource in time, frequency or a combination thereof.

As an example that the SA resource is distinguished from the normal SA resource in time domain, partial preceding time is used for transmitting the resource configuration SA among the whole of SA resources. According to the present scheme, first of all, UEs determine whether or not the resource configuration SA is transmitted. If the resource configuration SA is transmitted, the UEs identify a position of the resource configuration SA and transmit the normal SA of the UEs in accordance with the position of the resource configuration SA. By doing so, it may be able to prevent interference to the resource configuration SA.

As an example that the SA resource is distinguished from the normal SA resource in frequency domain, the resource configuration SA resource can be set to a specific frequency domain incapable of being used by the normal SA. According to the present scheme, since the normal SA and a D2D data channel according to the normal SA do not use the specific frequency domain and empty out the frequency domain, it may be able to protect the resource configuration SA and a resource configuration message according to the resource configuration SA from interference between D2D transmissions.

It is preferable that a frequency domain occupied by the resource configuration SA is distributed to overall system bandwidth. This is because, if a channel status of a specific frequency domain is not good, it is able to use a different frequency domain. As an example, in a system at which the total A number of RBs exist, when each SA uses B number of contiguous RBs, if the total C number of resource configuration SA resources are designated, a candidate position of each resource configuration SA can be determined by an RB including an index described in the following.

RB 0, 1, . . . , B−1=>resource configuration SA #0
RB floor(A/C), floor(A/C)+1, . . . , floor(A/C)+B−1=>resource configuration SA #1
RB 2*floor(A/C), 2*floor(A/C)+1, . . . , 2*floor(A/C)+B−1=>resource configuration SA #2
. . .
RB (C−1)*floor(A/C), (C−1)*floor(A/C)+1, . . . , (C−1)*floor(A/C)+B−1=>resource configuration SA #(C−1)

Of course, it may also be able to implement a form that a specific frequency domain at specific timing is occupied by the resource configuration SA using a combination of the indexes.

Figure 10:
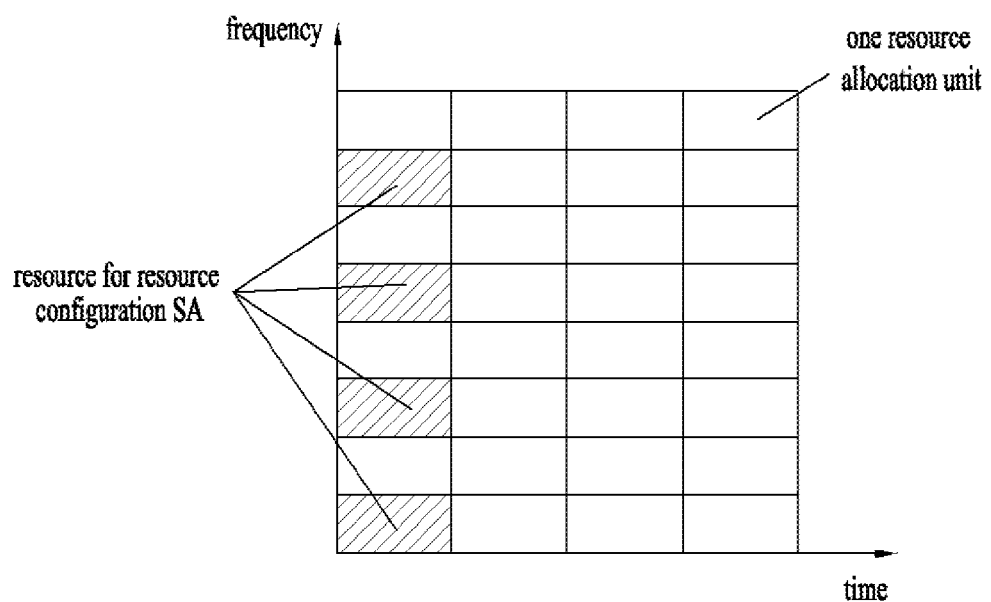
FIG. 10 is a diagram illustrating an example of a resource region configuration for a resource configuration SA according to a first embodiment of the present invention.

FIG. 10 is a diagram illustrating an example of a resource region configuration for a resource configuration SA according to a first embodiment of the present invention. Referring to FIG. 10, it is able to see that a resource region for the resource configuration SA is located at a first time resource. And, it is able to see that the resource region for the resource configuration SA is set to overall frequency domain in a manner of configuring the resource region to be alternately set in terms of a frequency resource index.

As mentioned in the foregoing description, the resource configuration SA can transmit an SA for delivering information necessary for transmitting and receiving various D2D signals to configure a resource pool. In this viewpoint, the resource configuration SA can be comprehended as a D2D operation control message and an SA related to the D2D operation control message.

In the following, a method of making an SA resource to which the resource configuration SA is transmitted (or capable of being transmitted) appear at specific timing only is explained in detail.

First of all, a UE detects a D2DSS and/or a PD2DSCH and matches synchronization with a different UE. In this procedure, the UE can obtain index information on a subframe in which the D2DSS and the PD2DSCH are transmitted. The index information on the subframe indicates an index of the subframe and an index of a radio frame. The index information can be represented by a sequence or a resource position used for the D2DSS, a bit field included in the PD2DSCH, or a combination thereof.

In this case, a subframe in which the aforementioned resource configuration SA or the resource configuration message is transmitted can be restricted to have a specific radio frame index and a specific subframe index. As an example, the resource configuration SA or the resource configuration message can be restricted to such a form as an $Y^{th}$ subframe of a $(X+i*P)^{th}$ radio frame. In this case, i corresponds to an integer equal to or greater than 0 and P corresponds to a period that the resource configuration SA or the resource configuration message appears.

If an index of a subframe in which a D2DSS or a PD2DSCH is transmitted is defined in advance, a subframe at which a resource configuration SA or a resource configuration message appears may appear at a subframe apart from the subframe in which the D2DSS or the PD2DSCH is transmitted as much as a prescribed offset. If the offset is 0, it indicates that the resource configuration SA or the resource configuration message is transmitted in a subframe identical to the subframe in which the D2DSS and the PD2DSCH are transmitted.

Meanwhile, although a resource configuration SA or an SA delivering information necessary for transmitting and receiving a D2D signal is not actually transmitted, it may be able to implicitly consider that the resource configuration SA or the SA is transmitted. In particular, if a resource configuration message or a message necessary for transmitting and receiving a D2D signal is transmitted all the time via a specific data channel resource, transmission of an SA for scheduling the message can be omitted. In other word, although an actual SA is not transmitted in a specific SA resource, UEs perform transmission and reception operations under an assumption that a main information signal such as a resource configuration message is transmitted in a data channel resource interlocked with the specific SA resource. If a time and frequency resource capable of transmitting a resource configuration message is fixed, a UE omits a procedure of detecting a resource configuration SA and may be able to immediately attempt to receive the resource configuration message in the time and frequency resource.

And, the resource configuration SA or the SA delivering information necessary for transmitting and receiving a D2D signal may use a special ID. In general, in order to distinguish a UE transmitting an SA from a UE receiving the SA, the SA can include an ID field. The ID field can be generated based on an ID of a transmission UE and/or an ID of a reception UE. A UE may attempt to detect data, which is transmitted by a transmission UE preferred by the UE only, or data to which a reception target including the UE is set only using an ID included in an SA. The ID of the SA can also be used for scrambling a data channel or determining a transmission parameter such as a hopping pattern of a resource in use. By doing so, it may be able to make a different transmission UE use a different transmission parameter.

In this case, if the resource configuration SA or the SA delivering information necessary for transmitting and receiving a D2D signal is configured by a predetermined ID, it is able to notify that the resource configuration SA or the SA delivering information necessary for transmitting and receiving a D2D signal is delivered on a data channel according to the SA. As an example, all IDs of the SA can be determined in advance.

As a different example, when an ID of an SA is generated using a combination of a transmission UE ID and a reception UE ID, a transmission UE ID part is generated based on an ID of a UE actually transmitting the SA and a reception UE ID part is fixed by a predetermined value. Hence, UEs identify a part generated from the reception UE ID only and may be then able to identify that the SA corresponds to a resource configuration SA. In this case, a transmission parameter of a resource configuration message transmitted by a different UE can be differently configured.

As a further different example, when an ID of an SA is generated using a combination of a transmission UE ID and a reception UE ID, a reception UE ID part is generated based on an ID corresponding to broadcasting broadcasted to all UEs and a transmission UE ID part can be fixed by a predetermined ID corresponding to a resource configuration SA. In this case, a UE checks the reception ID part and may be then able to know that all UEs are configured as a reception target. The UE attempts to perform reception. At the same time, the UE checks the transmission ID part and may be then able to identify that the SA corresponds to a resource configuration SA. As a concrete example of generating the ID of the SA using the combination of the transmission UE ID and the reception UE ID, several top bits of the ID of the SA are generated based on the transmission UE ID and the rest of bottom bits of the ID are generated based on the reception UE ID.

And, a resource configuration SA may appear once in several periods instead of appearing in every SA period. This can be more effective when it is expected that a resource configuration message is not frequently changed. It may have a merit of reducing resource overhead for transmitting a resource configuration message and an SA. As an example, when the total SA resources appear with a period of X subframes, a resource configuration SA (and, a resource configuration message according to the resource configuration SA) appears once in every Y SA resource and may have a period of total (X*Y) subframes.

In addition, while a resource configuration SA is independently transmitted without being multiplexed with a different D2D data, a normal SA may have a characteristic of being transmitted together with D2D data in a manner of being multiplexed with the D2D data. In particular, according to the present scheme, since transmit powers of a unit SA resource and a transmission UE are used for transmitting a resource configuration SA only, it may be able to more enhance transmission performance and coverage of the resource configuration SA.

In the following, an operation and a characteristic of a UE capable of transmitting a resource configuration SA are explained in detail.

If a specific UE located at the outside of coverage of an eNB does not match synchronization with a D2DSS transmitted from a different UE and transmits a D2DSS or a PD2DSCH on the basis of internal synchronization of the specific UE to perform D2D communication with a neighboring UE (hereinafter, the specific UE is referred to as I-SS (independent synchronization source)), since the I-SS becomes a reference for synchronization of a series of UEs, it may be preferable to perform resource configuration in accordance with the I-SS. In particular, if a UE matches synchronization with a D2DSS transmitted by the I-SS, basically, the UE does not transmits a resource configuration SA and a resource configuration message. Instead, the UE operates by receiving a resource configuration SA and a resource configuration message transmitted by the I-SS. Yet, there may exist an exception when the UE instead of the I-SS relays a D2DSS or a PD2DSCH to synchronize with a different UE. Regarding this, it shall be explained later in detail.

Meanwhile, if a specific UE located at the inside of coverage of an eNB transmits a D2DSS or a PD2DSCH to perform D2D communication with a UE located at the outside of the coverage of the eNB, the specific UE can transmit a resource configuration message. Yet, in order to match a resource configuration used by the UE belonging to the coverage of the eNB and a resource configuration used by the UE located at the outside of the coverage of the eNB with each other, the eNB can designate contents of the resource configuration message. In this case, UEs participating in D2D at the outside of the coverage of the eNB do not transmit a resource configuration message. The UEs operate by receiving a resource configuration message transmitted by the UE belonging to the coverage of the eNB. The UE belonging to the coverage of the eNB can notify that a signal is transmitted from the UE belonging to the coverage of the eNB via a D2DSS or a PD2DSCH. Yet, there may exist an exception when the UE located at the outside of the coverage of the eNB relays a D2DSS or a PD2DSCH to synchronize with a different UE.

According to the present invention, when a specific UE transmits a D2D signal of the specific UE by matching synchronization with a D2DSS or a PD2DSCH transmitted by an I-SS or a UE belonging to coverage of an eNB, as mentioned in the foregoing description, the specific UE does not transmit a resource configuration SA and a resource configuration message as a basic operation principle of the present invention. Yet, when the specific UE transmits a D2DSS or a PD2DSCH to match synchronization with a different UE, i.e., the I-SS or the UE located at the outside of the coverage of the eNB, the specific UE can perform a normal D2D operation only when a resource configuration message is transmitted as well according to the D2DSS or the PD2DSCH.

In this case, the specific UE should transmit not only the resource configuration message but also a resource configuration SA for the resource configuration message. In this case, it is preferable to transmit a different resource configuration SA in order to prevent the resource configuration SA transmitted by the specific UE from being collided with a resource configuration SA transmitted by the legacy I-SS or the UE belonging to the coverage of the eNB. Of course, it may also be able to differently configure a resource used by the resource configuration message.

Generally speaking, when a specific UE transmits a D2DSS or a PD2DSCH of n numbers hops, the specific UE can transmit a resource configuration SA and a resource configuration message using a resource interlocked with the hop count. In particular, resources capable of being used as the resource configuration SA and the resource configuration message are separated according to the D2DSS/PD2DSCH transmission hop count of a transmission UE. In this case, it is able to see that the I-SS transmits a D2DSS and a PD2DSCH of hop count #0. A hop count receiving a D2DSS/PD2DSCH of hop count #(n−1) and transmitting a D2DSS/PD2DSCH by matching synchronization with the D2DSS/PD2DSCH of the hop count #(n−1) can be defined as hop count #n. By doing so, it is able to transmit a resource configuration message of a next hop count while a previously received resource configuration message is not affected by interference.

Identical content can be repeated in the resource configuration message of the hop count #n and the message of the hop count #(n−1). Or, the resource configuration message of the hop count #n can be induced from the message of the hop count #(n−1) according to a predetermined rule. Or, message contents of the hop count #n may be already included in the message of the hop count #(n−1). If a period of a resource configuration SA corresponds to a multiple number of a period of an SA, a resource configuration SA of each hop count may alternately appear in every SA period. For example, a resource configuration SA of a hop count #0 and a resource configuration SA of a hop count #1 may appear in a first SA period and a second SA period, respectively.

When a D2DSS is relayed according to a hop count, it is necessary to transmit a D2DSS of a different hop count in a different resource to transmit a D2DSS of a hop count #n while synchronization is matched with a hop count #(n−1). As mentioned in the foregoing description, if a resource of a D2DSS/PD2DSCH varies according to a hop count, there may exist an interworking relationship between a positon of a resource for such a synchronization signal as a D2DSS/PD2DSCH and resources for a resource configuration message and a resource configuration SA. In particular, when a UE transmits a synchronization signal using a different synchronization signal transmission resource, the UE uses a different resource configuration SA resource and a different resource configuration message according to the interworking relationship.

The interworking relationship between a synchronization signal transmission resource and a resource configuration resource is not limited to a D2DSS using a hop count only. The interworking relationship can also be applied to a scheme of transmitting a normal D2DSS.

Figure 11:
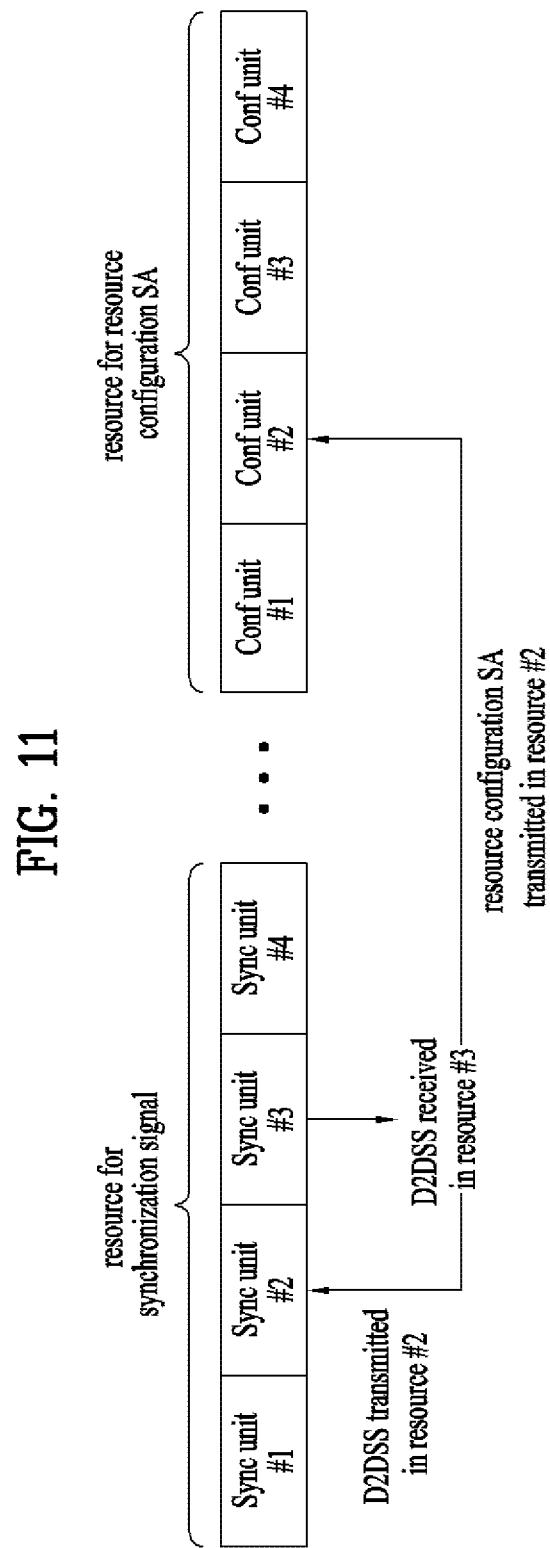
FIG. 11 is a diagram illustrating an example of transmitting a resource configuration SA according to a first embodiment of the present invention.

FIG. 11 is a diagram illustrating an example of transmitting a resource configuration SA according to a first embodiment of the present invention.

Referring to FIG. 11, four subframes in total are designated as a resource for a synchronization signal. The subframes corresponding to the resource for the synchronization signal are respectively interlocked with subframes corresponding to a resource for a resource configuration SA. In this situation, a UE receives a D2DSS in a resource #3 for a synchronization signal and transmits a D2DSS of the UE in a resource #2 for a synchronization signal in a next period based on the D2DSS received in the resource #3. At the same time, the UE transmits a resource configuration SA or a resource configuration message using the resource #2 for the interlocked resource configuration SA.

Meanwhile, in case of performing D2D in a situation that there is no connected UE, all UEs can use a predetermined resource configuration. In this case, it is not necessary to prepare a separate resource configuration SA and a resource for a message. Hence, when a specific UE transmits a D2DSS, which is firstly generated at the outside of coverage of an eNB, it is not necessary for the specific UE to separately transmit a resource configuration message. Having received the D2DSS, the UE can immediately use a predetermined configuration while a reception procedure of a separate resource configuration message is omitted. In this case, since it is not necessary to separately reserve a resource for the aforementioned resource configuration SA, it is able to transmit an SA in all SA resources without any restriction.

When a specific UE transmits a resource configuration message according to the aforementioned scheme, the UE may perform D2D data channel transmission for user data of the specific UE. In this case, a channel including a resource configuration message and a channel including user data can be transmitted at the same time at specific timing according to a resource configuration used by each message. In general, since implementation complexity of a UE transmitting channels of two types at the same time is too complex, in this case, the UE can be configured to transmit a single message only. In this case, the resource configuration message of which importance is high is transmitted and the user data can be temporarily dropped. Or, the two messages can be transmitted in a manner of being multiplexed to a single channel. As an example, the resource configuration message is preferentially mapped to a usable resource and then the user data is additionally mapped using a remaining RE.

In the following, a method of performing the operation mentioned earlier in FIG. 9 without a separate explicit signaling for an SA pool is explained.

According to the operation mentioned earlier in FIG. 9, a UE obtains information on an SA resource pool in a synchronization procedure. In this case, although the information on the SA resource pool can be delivered via the aforementioned channel such as the PD2DSCH, the UE can also obtain the information without the separate signaling.

As an example, the SA resource pool is determined in advance and can be inputted to a UE. Specifically, the SA resource pool can be inputted to the UE in a manner of being configured in a specific RB of a specific subframe. The UE obtains time and frequency synchronization of a D2D system by detecting a D2DSS and attempts to detect an SA by considering a resource region inputted in advance as an SA resource pool on the basis of the obtained time and frequency synchronization. In this case, in some cases, an actual SA resource pool may correspond to a subset of a pool inputted to the UE in advance. The actual SA resource pool also corresponds to a subset of a resource configuration message and can be delivered to the UE via an SA and an interlocked communication channel.

First of all, the UE attempts to detect an SA using a predetermined SA resource pool, preferably, a universal set of an available SA resource pool. If the UE is able to receive a resource configuration message via the SA resource pool, the UE is able to identify an actual SA resource pool included in the resource configuration message. Thereafter, the UE attempts to receive an SA in the actual SA resource pool only. Or, the predetermined SA resource pool includes a pool for an SA for transmitting a resource configuration message only. A pool capable of transmitting a normal SA may be bigger than the predetermined SA resource pool. In particular, the SA for transmitting the resource configuration message is transmitted in the inside of the predetermined SA resource pool only. On the contrary, other SA can be transmitted using a resource rather than the predetermined pool. Of course, in this case, a resource pool for other SA should be delivered to the UE via the resource configuration message.

As an example of the predetermined SA resource pool, a time resource of the SA resource pool may correspond to a subframe which is moved as much as a prescribed subframe offset on the basis of a subframe in which a UE receives a D2DSS, or a plurality of subframes which are determined according to a plurality of subframe offsets. Similarly, a frequency resource of the SA resource pool may correspond to an RB area which is moved as much as a prescribed RB offset on the basis of a frequency region in which a D2DSS is received, or a plurality of RB areas which are determined according to a plurality of frequency offsets. Specifically, the predetermined SA resource pool can be configured by a frequency region at which a D2DSS is detected of a subframe at which a D2DSS is detected. This can be comprehended as a subframe offset and a frequency offset correspond to 0. Regarding this, it shall be explained in the following with reference to a drawing.

Figure 12:
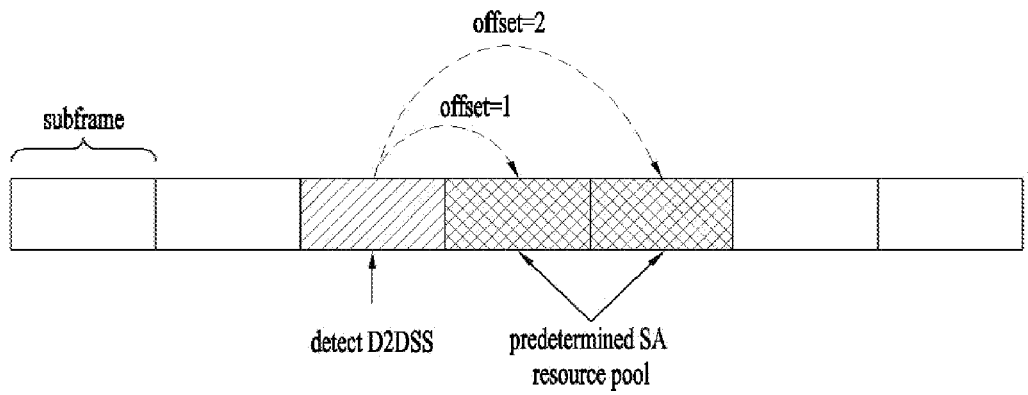
FIG. 12 is a diagram illustrating an example of configuring a resource configuration SA in advance according to a first embodiment of the present invention.

FIG. 12 is a diagram illustrating an example of configuring a resource configuration SA in advance according to a first embodiment of the present invention. In particular, in FIG. 12, assume a case that subframe offsets 1 and 2 are defined in advance.

Referring to FIG. 12, two subframes appearing after a subframe in which a D2DSS is detected become a time resource of a predetermined SA resource pool. Of course, a period of repeating an SA resource pool can also be determined in advance.

Since a resource configuration SA or other SA delivering information necessary for transmitting and receiving a D2D signal corresponds to important information to be delivered to all UEs, information amount can be reduced by omitting a part of information among information included in the SA. As a result, it may be able to increase a reception success rate. As an example, all or a part of bit fields indicating MCS can be disappeared or fixed by a predetermined value. As a different example, all or a part of bit fields indicating a bandwidth of transmission data can be disappeared or fixed by a predetermined value.

<Embodiment 2>

If an SA, which is used by a UE belonging to coverage of an eNB to relay resource configuration information delivered by the eNB to a UE located at the outside of the coverage, is separated from an SA used by a UE performing other operation according to the aforementioned embodiments, it may be able to protect the resource configuration information from interference caused by other transmission. In a broad sense, it may be able to separate an SA, which is used by the UE belonging to the coverage to receive other control information from the eNB and relay the control information to the UE located at the outside of the coverage, from an SA used by a UE performing other operation in a resource configuration.

As an example of the control information, there may exist a paging message of a network that induces a specific UE to access the network. When a UE transmitting a relay signal receives a paging message (or a message including a list of UEs necessary to access a network) transmitted by an eNB and relays the message to a UE located at the outside of the coverage, the UE may be able to use an SA separated from a SA used for a normal operation. In a broad sense, if an SA, which is used for a UE belonging to the coverage of the eNB to receive various data including general user data from the eNB and relay the data to a UE located at the outside of the coverage, is separated from an SA used for other case (e.g., a case of transmitting data generated by the UE instead of data relayed to the UE located at the outside of the coverage), it may be able to obtain an identical effect.

For clarity, a UE belonging to coverage of an eNB, receiving a message transmitted by the eNB, and relaying the message to a UE located at the outside of the coverage is referred to as a relay UE. As mentioned in the foregoing description, the relay UE can relay not only control information such as resource configuration information but also user data to be transmitted to a specific UE in a manner of receiving the user data from the eNB. In this case, a part of SA resources is designated as resources capable of being used by the relay UE only among the total SA resource pool and it may be able to regulate a UE not performing a relay operation not to use the SA resources. The relay UE selects an appropriate resource from among the designated SA resources and transmits an SA necessary for a relaying operation. By doing so, it may be able to protect not only resource configuration information such as information to be delivered by an eNB to UEs located at the outside of the coverage of the eNB but also user data delivered to the UEs located at the outside of the coverage of the eNB from interference.

In terms of relay of user data, since the user data has already experienced time delay of a certain level while passing through a relaying procedure, remaining time is relatively short and it is difficult to increase the transmission count. Hence, in order to secure stable performance with less transmission count, it may be profitable to protect the user data from interference. A relay UE can transmit a signal to a plurality of UEs. On the contrary, the relay UE is unable to transmit an SA to a plurality of UEs at a single timing. Hence, if resources capable of being used by the relay UE only are uniformly distributed in a time dimension, the relay UE can transmit an SA to a plurality of UEs using time different from each other.

If it is necessary for a relay UE to transmit an SA using various SA transmission time and receive an SA of a different UE at the same time, an SA resource capable of being used by the relay UE only can be concentrated to specific subframes. By doing so, the relay UE can transmit the SA using the subframes and receive the SA of the different UE using the rest of subframes.

Yet, if a considerable amount of SAs are required by the relay UE, the resource capable of being used by the relay UE only may be insufficient. It is able to permit the relay UE to use not only the resource capable of being used by the relay UE only but also an SA resource. This indicates that the relay UE is able to use the total SA pool but a non-relay UE uses a subset of the total SA pool only.

The aforementioned operation indicates that the relay UE has higher priority in selecting an SA resource compared to other UEs. In particular, the total SA resources are divided into several groups and a specific group among the groups can be configured to be used by a UE having specific priority only. In this point of view, the aforementioned operation capable of being used by the relay UE and incapable of being used by a non-relay UE is to give higher priority to the relay UE.

There may exist various elements for determining priority in selecting an SA resource as well as an element for determining whether a UE corresponds to a relay UE. For example, an ID of a transmission UE or an ID of a reception UE (or a group of reception UEs) may also correspond to an element for determining priority. This is aimed for giving higher priority to data transmitted by a more importance UE and/or data received by a more important UE.

Hence, although it has an identical transmission UE ID and/or an identical reception UE ID, it may be able to differently give priority according to whether or not a UE performs a relay operation. In particular, in a situation of having an identical transmission/reception UE ID, if a specific UE performs a relay operation, it may be able to give higher priority to the specific UE. If the specific UE does not perform a relay operation, it may be able to give relatively lower priority to the specific UE.

As an example, in a situation that priority is determined based on an ID of a reception UE, if a UE 1 relays data to a UE 3 via a relay operation and a UE 2 transmits data generated by the UE 2 to the UE 3, since an ID of a reception UE is the same, the UE 1 and the UE 2 may have identical priority in selecting a resource. Yet, since the UE 1 performs the relay operation, higher priority can be finally provided to the UE 1. Consequently, it may be able to permit the UE 1 to use a resource incapable of being used by the UE 2.

In the following, different methods for determining priority of a relay UE or transmission priority transmitted to a relay UE are explained when the priority is determined according to an ID of a transmission UE and/or an ID of a reception UE.

First of all, priority of an SA and data transmitted by a relay UE can be determined according to an ID of a UE which has generated original data.

Figure 13:
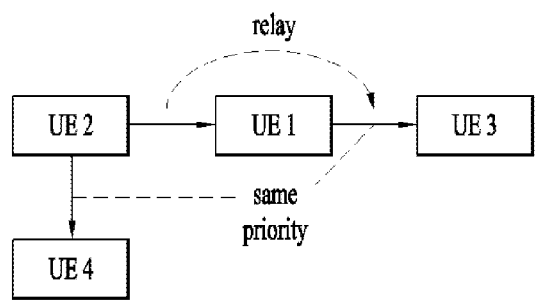
FIG. 13 is a diagram illustrating an example of determining priority according to an ID of a UE, which has generated an original data, according to a second embodiment of the present invention

FIG. 13 is a diagram illustrating an example of determining priority according to an ID of a UE, which has generated an original data, according to a second embodiment of the present invention Referring to FIG. 13, when a UE 1 relays data generated by a UE 2 to a UE 3, an SA or data relayed by the UE 1 to the UE 3 can be configured to have priority identical to priority of an SA or data transmitted to a UE 4 by the UE 2. This indicates that priority of transmitting an original data at all links is determined according to a UE which has generated the original data.

In an example of FIG. 13, if a UE 1 corresponds to a UE belonging to coverage of a network and relaying between the network and a UE located at the outside of the coverage, the example of FIG. 13 may correspond to relay of a downlink signal. In particular, transmission transmitted to the UE 1 from the UE 2 can include legacy cellular communication (i.e., uplink transmission transmitted from the UE 2 to an eNB with which the UE 2 is connected), a core network after the eNB, and downlink transmission transmitted from an eNB with which the UE 1 is connected to the UE 1. In this case, transmission transmitted from the UE 1 to the UE 3 may correspond to D2D transmission only. Of course, transmission transmitted from the UE 2 to the UE 4 may correspond to D2D transmission.

As a variation of the operation shown in FIG. 13, it may be able to determine final priority of transmission according to higher priority among priority determined by an ID of a relay UE and priority determined by an ID of a UE which has generated an original data. According to the variation, although priority of the UE 2 is lower, if priority of the UE 1 is high, priority of a signal, which is generated by the UE 2 and relayed to the UE 3 by the UE 1, can be higher at least in transmission of the UE 1. In particular, if the relaying operation is quickly terminated in the UE 1 of which the priority is high, it may be able to help other data transmission of the UE 1 to maintain high priority. In addition, a signal transmitted by a relay UE has a unique transmission UE ID and/or a unique reception UE ID (or an ID selected from the set of the unique transmission UE ID and the unique reception UE ID). The unique UE ID may have priority capable of using an SA resource incapable of being used by a signal including priority lower than the priority of the unique UE ID.

Priority of an SA and data transmitted by a relay UE can be determined according to an ID of a UE to finally receive an original data. When a UE 1 relays data generated by a UE 2 to a UE 3, it is able to configure priority of an SA or data relayed by the UE 1 to have priority identical to priority of data transmitted by other UE in a situation that a reception target of the data is the same (i.e., UE 3). This operation follows a principle that priority of data transmitted at all links is determined according to importance of a UE receiving a final data.

Specifically, when a UE 2 transmits a signal to a UE 1, although a receiving end of the transmission itself corresponds to the UE 1, since the data is to be finally delivered to a UE 3 by passing through a relaying procedure, the UE 2 can transmit the signal to the UE 1 by applying priority which is used for the UE 2 to transmit data to the UE 3. Of course, since the UE 1 attempts to receive relevant data only when an ID of the UE 1 is included in a physical layer ID, the UE 3 corresponding to an ID of a final receiving end is included in a higher layer payload only and a reception ID appearing at a physical layer can be induced from the ID of the UE 1 corresponding to a reception UE of a corresponding link. In this case, the physical layer ID may correspond to ID information included in a transmission parameter of an SA. First of all, the UE 1 identifies that the physical layer ID is induced from an ID of the UE 1 and then attempts to receive data. The UE 1 identifies that it is necessary to relay the data to the UE 3 by finally decoding the higher layer payload and may be then able to perform a relaying operation.

Figure 14:
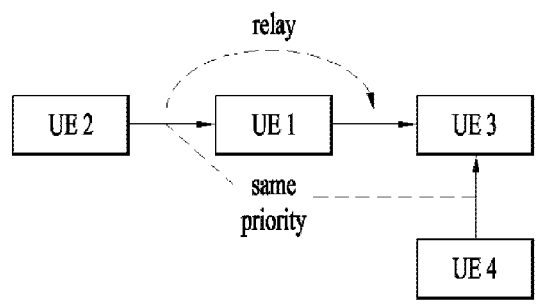
FIG. 14 is a diagram illustrating an example of determining priority according to an ID of a UE configured to finally receive data according to a second embodiment of the present invention.

FIG. 14 is a diagram illustrating an example of determining priority according to an ID of a UE configured to finally receive data according to a second embodiment of the present invention.

Referring to FIG. 14, when data of a UE 2 is relayed to a UE 3 through a UE 1, since a signal transmitted to the UE 1 by the UE 2 has a final reception UE ID identical to that of a signal transmitted to the UE 3 by a UE 4 corresponding to other UE, it is able to see that the signals have identical priority.

In an example of FIG. 14, if the UE 1 corresponds to a UE belonging to coverage of a network and relaying between the network and a UE located at the outside of the coverage, it may correspond to uplink signal relay. In particular, transmission transmitted to the UE 3 from the UE 1 can include legacy cellular communication (i.e., uplink transmission transmitted from the UE 1 to an eNB), a core network after the eNB, and downlink transmission transmitted from an eNB to the UE 3. In this case, transmission transmitted from the UE 2 to the UE 1 may correspond to D2D transmission only. Of course, transmission transmitted from the UE 4 to the UE 3 may correspond to D2D transmission.

As a variation of the operation shown in FIG. 14, it may be able to determine final priority of transmission according to higher priority among priority determined by an ID of a relay UE and priority determined by an ID of a final reception UE. Although priority of the UE 3 is lower, if priority of the UE 1 is high, priority of a signal, which is generated by the UE 2 and transmitted to the UE 1, may become higher. Hence, if the relaying operation is quickly terminated in the UE 1 of which the priority is high, it may be able to help other data transmission transmitted to the UE 1 to maintain high priority. In addition, a signal transmitted to a relay UE has a unique reception UE ID (or an ID selected from the set of unique reception UE IDs). The unique reception UE ID may have priority capable of using an SA resource incapable of being used by a signal including priority lower than the priority of the unique reception UE ID.

Meanwhile, if priority is configured by a combination of an ID of a transmission UE and an ID of a reception UE, priority can also be determined according to a combination of an ID of a UE, which has generated an original data, and an ID of a final data reception UE in signal transmission and reception in which a relay UE is involved. In other word, when the relay UE receives a signal from the UE, which has generated the original data, or when the relay UE transmits a signal to the final data reception UE, priority can be determined as if the final data reception UE has received the signal or the original data generating UE has transmitted the signal. Hence, priority of an individual relay link is determined according to importance of a UE generating a signal and importance of a UE receiving the signal irrespective of an ID of a relay UE.

Figure 15:
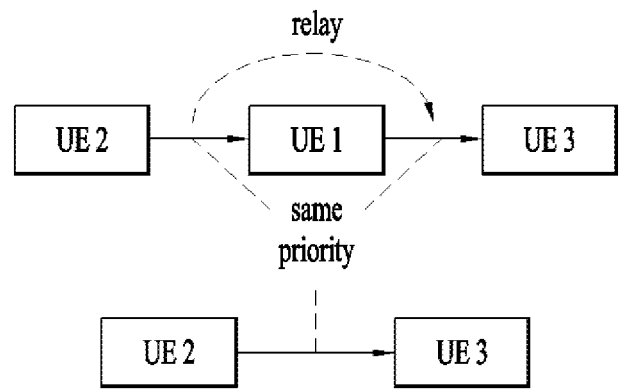
FIG. 15 is a diagram illustrating an example of determining priority according to a combination of an ID of a transmission UE and an ID of a reception UE according to a second embodiment of the present invention.

FIG. 15 is a diagram illustrating an example of determining priority according to a combination of an ID of a transmission UE and an ID of a reception UE according to a second embodiment of the present invention.

Referring to FIG. 15, when data generated by a UE 2 is finally delivered to a UE 3, it is able to apply identical priority irrespective of whether or not a relay UE exists between the UE 2 and the UE 3.

In the foregoing description, priority of selecting an SA resource is explained in a form of defining a prescribed set of SA resources in a resource pool. Yet, priority can also be distinguished from each other on the basis of a resource pool. As an example, after a plurality of SA resource pools are formed, a specific SA resource pool can be used by a signal of predetermined priority or priority higher than the predetermined priority only according to priority of a transmission signal.

Figure 16:
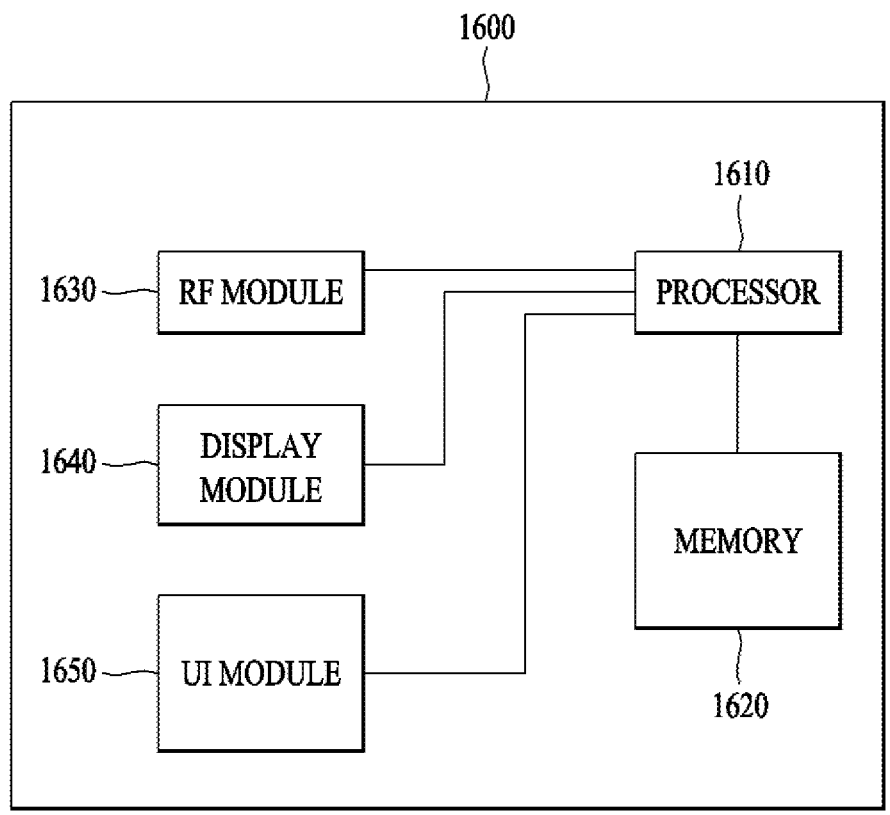
FIG. 16 is a block diagram for a communication device according to the present invention.

FIG. 16 is a block diagram for a communication device according to the present invention.

Referring to FIG. 16, a communication apparatus 1600 includes a processor 1610, a memory 1620, an RF module 1630, a display module 1640, and a User Interface (UI) module 1650.

The communication device 1600 is shown as having the configuration illustrated in FIG. 16, for the convenience of description. Some modules may be added to or omitted from the communication apparatus 1600. In addition, a module of the communication apparatus 1600 may be divided into more modules. The processor 1610 is configured to perform operations according to the embodiments of the present invention described before with reference to the drawings. Specifically, for detailed operations of the processor 1210, the descriptions of FIGS. 1 to 15 may be referred to.

The memory 1620 is connected to the processor 1610 and stores an Operating System (OS), applications, program codes, data, etc. The RF module 1630, which is connected to the processor 1610, upconverts a baseband signal to an RF signal or downconverts an RF signal to a baseband signal. For this purpose, the RF module 1630 performs digital-to-analog conversion, amplification, filtering, and frequency upconversion or performs these processes reversely. The display module 1640 is connected to the processor 1610 and displays various types of information. The display module 1640 may be configured as, not limited to, a known component such as a Liquid Crystal Display (LCD), a Light Emitting Diode (LED) display, and an Organic Light Emitting Diode (OLED) display. The UI module 1650 is connected to the processor 1610 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of allocating a resource for a control signal of direct device-to-device communication in a wireless communication system and an apparatus therefor are described with reference to examples applied to 3GPP LTE system, it may be applicable to various kinds of wireless communication systems as well as the 3GPP LTE system.

What is claimed is:

1. A method of setting, by a user equipment, a resource pool for direct device-to-device (D2D) communication in a wireless communication system, the method comprising:
   obtaining first information on a scheduling assignment (SA) resource pool via a synchronization procedure from a specific user equipment;
   detecting a resource allocation SA from the SA resource pool;
   receiving a first D2D data channel through a resource indicated by the resource allocation SA, the first D2D data channel containing second information on a resource pool for a second D2D data channel containing user data or a resource pool for a discovery signal; and
   configuring the resource pool for the second D2D data channel or the resource pool for the discovery signal according to the second information.

2. The method of claim 1, wherein obtaining the first information on the SA resource pool comprises receiving a synchronization channel containing a synchronization signal and additional information for the synchronization signal from the specific user equipment, and wherein the first information on the SA resource pool is contained in the synchronization channel.

3. The method of claim 1, the method further comprising:
   receiving a normal SA containing resource allocation information for the second D2D data channel from the SA resource pool; and
   transmitting the second D2D data channel using one or more resource units contained in the resource pool for the second D2D data channel according to the resource allocation information.

4. The method of claim 3, wherein the SA resource pool is classified into a resource unit for the resource allocation SA and a resource unit for the normal SA.

5. The method of claim 2, wherein the SA resource pool is located at in subframe apart from a subframe in which the synchronization signal and the synchronization channel are received by as much as a predetermined offset.

6. The method of claim 1 further comprising
   transmitting the second D2D data channel by randomly selecting at least one or more resource units contained in the resource pool for the second D2D data channel.

7. The method of claim 1 further comprising
   transmitting the discovery signal by randomly selecting at least one or more resource units contained in the resource pool for the discovery signal.

8. The method of claim 1, wherein obtaining the first information on the SA resource pool comprises receiving a synchronization signal from the specific user equipment, and wherein the SA resource pool is located in a subframe apart from a subframe in which the synchronization signal is received by as much as a predetermined offset.

9. A user equipment performing direct device-to-device (D2D) communication in a wireless communication system, the user equipment comprising:
   a transceiver that transmits and receives a signal with a different user equipment or a network; and
   a processor, coupled to the transceiver, that:
   controls the transceiver to receive first information on a scheduling assignment (SA) resource pool via a synchronization procedure from a specific user equipment,
   detects a resource allocation SA from the SA resource pool,
   controls the transceiver to receive a first D2D data channel through a resource indicated by the resource allocation SA, the first D2D data channel containing second information on a resource pool for a second D2D data channel containing user data or a resource pool for a discovery signal, and
   configures the resource pool for the second D2D data channel or the resource pool for the discovery signal according to the second information.

10. The user equipment of claim 9, wherein the processor further controls the transceiver to receive a synchronization channel containing a synchronization signal and additional information for the synchronization signal from the specific user equipment, and wherein the first information on the SA resource pool is contained in the synchronization channel.

11. The user equipment of claim 9, wherein the processor further controls the transceiver to receive a normal SA containing resource allocation information for the second D2D data channel from the SA resource pool and transmit the second D2D data channel using one or more resource units contained in the resource pool for the second D2D data channel according to the resource allocation information.

12. The user equipment of claim 11, wherein the SA resource pool is classified into a resource unit for the resource allocation SA and a resource unit for the normal SA.

13. The user equipment of claim 10, wherein the SA resource pool is located in a subframe apart from a subframe in which the synchronization signal and the synchronization channel are received by as much as a predetermined offset.

14. The user equipment of claim 9, wherein the processor further controls the transceiver to transmit the second D2D data channel by randomly selecting at least one or more resource units contained in the resource pool for the second D2D data channel.

15. The user equipment of claim 9, wherein the processor further controls the transceiver to transmit the discovery signal by randomly selecting at least one or more resource units contained in the resource pool for the discovery signal.

16. The user equipment of claim 9, wherein the processor further controls the transceiver to receive a synchronization signal from the specific user equipment and wherein the SA resource pool is located in a subframe apart from a subframe in which the synchronization signal is received by as much as a predetermined offset.

* * * * *